US009494692B2

(12) United States Patent
Leclercq et al.

(10) Patent No.: US 9,494,692 B2
(45) Date of Patent: Nov. 15, 2016

(54) METHOD AND SYSTEM FOR POWER OPTIMIZATION FOR A GLOBAL NAVIGATION SATELLITE SYSTEM

(71) Applicants: Maxime Leclercq, Encinitas, CA (US); Ioannis Spryopoulos, La Jolla, CA (US); Nishant Kumar, San Diego, CA (US); Saju Palayur, San Diego, CA (US)

(72) Inventors: Maxime Leclercq, Encinitas, CA (US); Ioannis Spryopoulos, La Jolla, CA (US); Nishant Kumar, San Diego, CA (US); Saju Palayur, San Diego, CA (US)

(73) Assignee: Maxlinear, Inc., Carlsbad, CA (US)

(*) Notice: Subject to any disclaimer, the term of this patent is extended or adjusted under 35 U.S.C. 154(b) by 1034 days.

(21) Appl. No.: 13/626,660

(22) Filed: Sep. 25, 2012

(65) Prior Publication Data

US 2015/0301192 A1    Oct. 22, 2015

Related U.S. Application Data

(60) Provisional application No. 61/552,682, filed on Oct. 28, 2011, provisional application No. 61/552,729, filed on Oct. 28, 2011, provisional application No. 61/569,639, filed on Dec. 12, 2011, provisional application No. 61/623,026, filed on Apr. 11, 2012.

(51) Int. Cl.

| G01S 19/42 | (2010.01) |
|---|---|
| G01S 19/24 | (2010.01) |
| G01S 19/34 | (2010.01) |
| G01S 19/48 | (2010.01) |

(52) U.S. Cl.
CPC .............. *G01S 19/24* (2013.01); *G01S 19/34* (2013.01); *G01S 19/42* (2013.01); *G01S 19/48* (2013.01)

(58) Field of Classification Search
CPC ........ G01S 19/28; G01S 19/24; G01S 19/42; G01S 19/48
USPC .................................................. 342/357.25
See application file for complete search history.

(56) References Cited

U.S. PATENT DOCUMENTS

| 5,410,728 A * | 4/1995 | Bertiger ............... H04B 7/1856 455/13.1 |
| 6,178,195 B1 * | 1/2001 | Durboraw, III ....... G01S 19/235 342/357.31 |
| 7,372,400 B2 * | 5/2008 | Cohen ..................... G01S 19/05 342/357.29 |
| 7,847,726 B2 * | 12/2010 | Jia .......................... G01S 19/34 342/357.62 |
| 2003/0083814 A1 * | 5/2003 | Gronemeyer .......... G01S 19/23 701/478 |
| 2008/0001819 A1 * | 1/2008 | Cohen .................. H04B 7/1853 342/357.44 |
| 2010/0073229 A1 * | 3/2010 | Pattabiraman .......... G01S 19/11 342/357.64 |
| 2010/0265128 A1 * | 10/2010 | Martens .................. G01S 19/38 342/357.25 |
| 2010/0283680 A1 * | 11/2010 | Vishin ..................... G01S 19/34 342/357.63 |

* cited by examiner

*Primary Examiner* — Frank J McGue

(74) *Attorney, Agent, or Firm* — McAndrews Held & Malloy

(57) ABSTRACT

Methods and systems for power optimization of a global navigation satellite system may comprise receiving LEO RF satellite signals utilizing a LEO satellite signal receiver path (LEO Rx) in a wireless communication device (WCD). Circuitry in the LEO Rx may be configured in a powered down state based on a sleep schedule. A location of the wireless communication device may be determined utilizing LEO signals received by the LEO Rx. The sleep schedule may be based on a desired accuracy of the determined location, the relative strengths of signals received from a plurality of LEO satellites, a relevance factor generated by a position engine and communicated to the sort module, or a desired power level of the WCD. The relative strengths of received signals may be compared utilizing a sort module in a LEO demodulator in the LEO satellite signal receiver path.

20 Claims, 16 Drawing Sheets

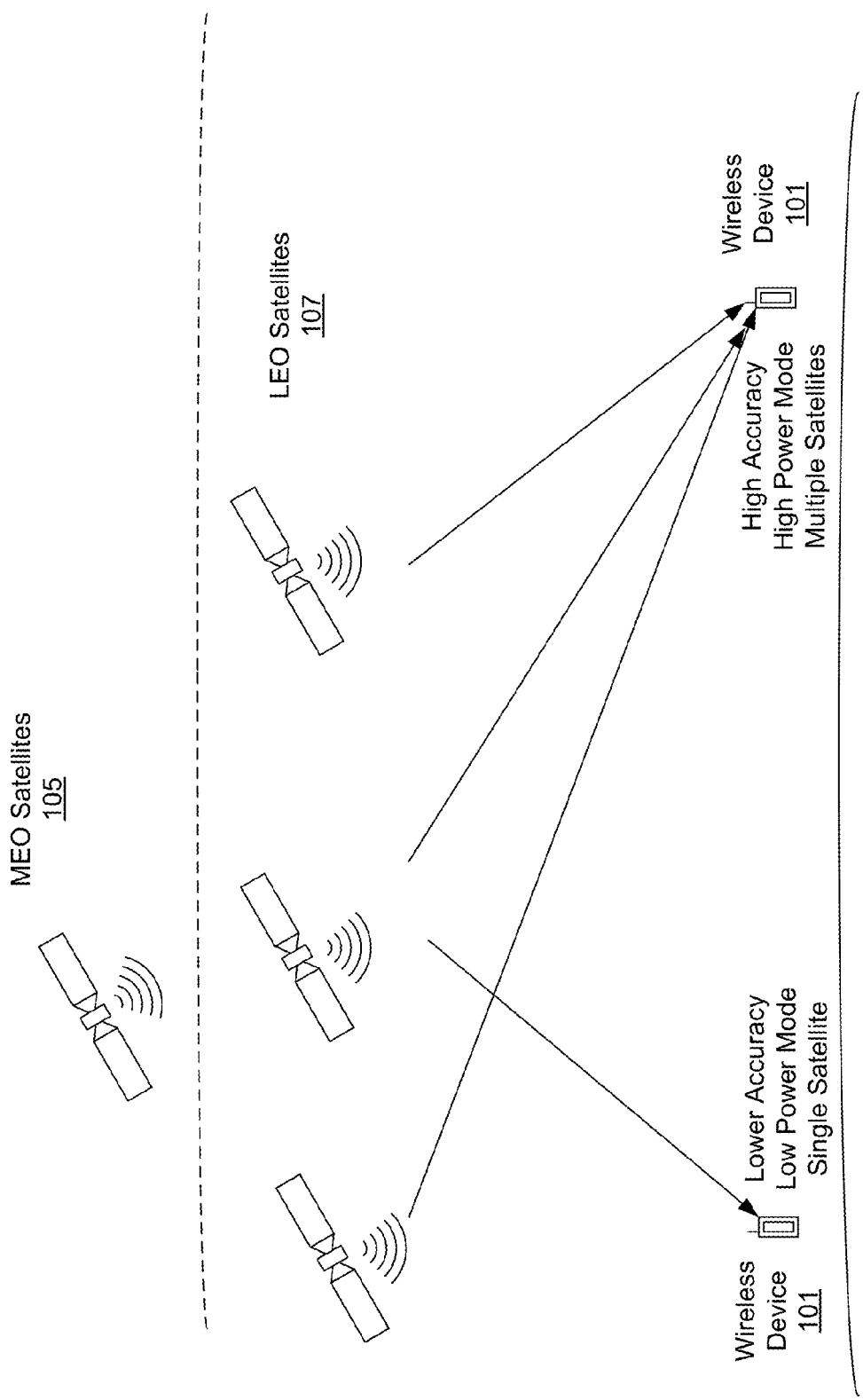

| UTC DATE | UTC TIME | LBFC | SVID | ID | BMID | TIMECODE | SDW | MDOID | NODE | TYPE | POWER | DELTA |
|---|---|---|---|---|---|---|---|---|---|---|---|---|
| 03/09/2012 | 16:03:51.710 | 1755369019 | 41 | 41 | 8 | 59 | 250 | 663 | 1 | 2 | 3 | 4 |
| 03/09/2012 | 16:03:51.890 | 1755369021 | 43 | 43 | 26 | 61 | 43 | 664 | 1 | 2 | 3 | 2 |
| 03/09/2012 | 16:03:52.160 | 1755369024 | 41 | 41 | 1 | 64 | 215 | 665 | 1 | 2 | 3 | 3 |
| 03/09/2012 | 16:03:52.340 | 1755369026 | 41 | 41 | 39 | 66 | 41 | 666 | 1 | 2 | 3 | 2 |
| 03/09/2012 | 16:03:52.430 | 1755369027 | 41 | 41 | 2 | 67 | 211 | 667 | 1 | 2 | 3 | 1 |
| 03/09/2012 | 16:03:52.790 | 1755369031 | 43 | 43 | 19 | 71 | 43 | 668 | 1 | 2 | 3 | 4 |
| 03/09/2012 | 16:03:52.880 | 1755369032 | 41 | 41 | 44 | 72 | 207 | 669 | 1 | 2 | 3 | 1 |
| 03/09/2012 | 16:03:53.330 | 1755369037 | 43 | 43 | 20 | 77 | 43 | 670 | 1 | 2 | 3 | 5 |
| 03/09/2012 | 16:03:53.600 | 1755369040 | 43 | 43 | 25 | 80 | 185 | 671 | 1 | 2 | 3 | 3 |
| 03/09/2012 | 16:03:53.780 | 1755369042 | 41 | 41 | 8 | 82 | 41 | 672 | 1 | 2 | 3 | 2 |
| 03/09/2012 | 16:03:54.140 | 1755369046 | 43 | 43 | 26 | 86 | 229 | 673 | 1 | 2 | 3 | 4 |
| 03/09/2012 | 16:03:54.320 | 1755369048 | 41 | 41 | 39 | 88 | 41 | 674 | 1 | 2 | 3 | 2 |
| 03/09/2012 | 16:03:54.410 | 1755369049 | 41 | 41 | 1 | 89 | 164 | 675 | 1 | 2 | 3 | 1 |
| 03/09/2012 | 16:03:54.680 | 1755369052 | 41 | 41 | 2 | 92 | 41 | 676 | 1 | 2 | 3 | 3 |
| 03/09/2012 | 16:03:54.860 | 1755369054 | 43 | 43 | 19 | 94 | 180 | 677 | 1 | 2 | 3 | 2 |
| 03/09/2012 | 16:03:55.040 | 1755369056 | 41 | 41 | 44 | 96 | 41 | 678 | 1 | 2 | 3 | 2 |
| 03/09/2012 | 16:03:55.400 | 1755369060 | 43 | 43 | 20 | 100 | 193 | 679 | 1 | 2 | 3 | 4 |
| 03/09/2012 | 16:03:55.670 | 1755369063 | 43 | 43 | 25 | 103 | 43 | 680 | 1 | 2 | 3 | 3 |

FIG. 12

METHOD AND SYSTEM FOR POWER OPTIMIZATION FOR A GLOBAL NAVIGATION SATELLITE SYSTEM

CROSS-REFERENCE TO RELATED APPLICATIONS/INCORPORATION BY REFERENCE

This application makes reference to and claims priority to U.S. Provisional Application Ser. No. 61/552,682 filed on Oct. 28, 2011, U.S. Provisional Application No. 61/552,729 filed on Oct. 28, 2011, U.S. Provisional Application No. 61/569,639 filed on Dec. 12, 2011, U.S. Provisional Application No. 61/623,026 filed on Apr. 11, 2012, and U.S. Provisional Application No. 61/664,503 filed on Jun. 26, 2012.

This application also makes reference to U.S. application Ser. No. 12/965,805 filed on Dec. 10, 2010.

Each of the above identified applications is hereby incorporated herein by reference in its entirety.

FIELD OF THE INVENTION

Certain embodiments of the invention relate to wireless communication. More specifically, certain embodiments of the invention relate to a method and system for power optimization of a global navigation satellite system.

Global navigation satellite systems (GNSS) such as the NAVSTAR global positioning system (GPS) or the Russian GLONASS provide accurate positioning information for a user anywhere on Earth that GNSS signals may be received. GNSS satellites are medium Earth orbit (MEO) satellites, about 12,000 miles above the surface. Highly accurate GNSS clock signals from these satellites may be used to accurately determine the position of a receiver.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for power optimization of a global navigation satellite system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1C is a schematic illustrating power optimization of a low Earth orbit (LEO) satellite receiver, in accordance with an embodiment of the invention.

FIG. 12 is an exemplary satellite burst schedule, in accordance with an embodiment of the invention

DETAILED DESCRIPTION OF THE INVENTION

Certain aspects of the invention may be found in a method and system for power optimization of a global navigation satellite system. Exemplary aspects of the invention may comprise receiving LEO RF satellite signals utilizing a LEO satellite signal receiver path in a wireless communication device. A location of the wireless communication device may be determined utilizing LEO signals received by the LEO satellite signal receiver path. Circuitry in the LEO satellite signal receiver path may be configured in a powered down state based on a sleep schedule. The sleep schedule may be based on a desired accuracy of the determined location. The sleep schedule may be based on relative strengths of signals received from a plurality of LEO satellites. The relative strengths of received signals may be compared utilizing a sort module in a LEO demodulator in the LEO satellite signal receiver path. The sleep schedule may be based on a relevance factor generated by a position engine and communicated to the sort module. The sleep schedule may be received from a server. The sleep schedule may be based on a desired power level of the wireless communication device. In-phase and quadrature signals may be processed in the LEO satellite signal receiver path. The wireless device may comprise a medium Earth orbit (MEO) satellite signal receiver path. The wireless communication device may be controlled by a reduced instruction set computing (RISC) central processing unit (CPU).

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1A:
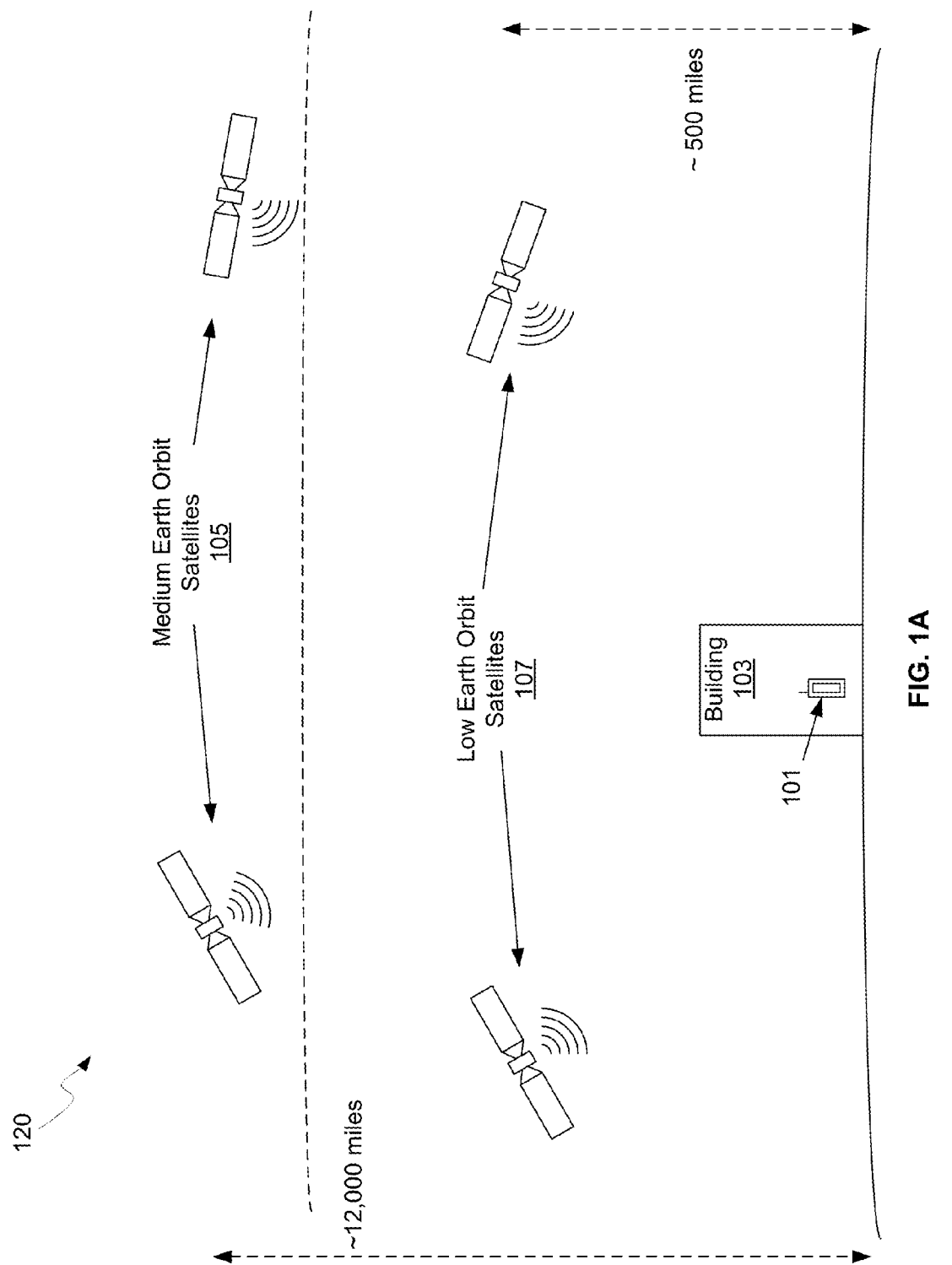
FIG. 1A is a diagram illustrating an exemplary wireless device with a global navigation satellite system, in accordance with an embodiment of the invention.

FIG. 1A is a diagram illustrating an exemplary wireless device with a global navigation satellite system, in accordance with an embodiment of the invention. Referring to FIG. 1A, there is shown a satellite navigation system 120 comprising a wireless communication device 101, a building 103, medium Earth orbit (MEO) satellites 105, and low Earth orbit (LEO) satellites 107. There is also shown the approximate height in miles of medium Earth and low Earth satellites of ~12,000 miles and ~500 miles, respectively.

The wireless communication device 101 may comprise any device or vehicle (e.g. smart phone) where its user may desire to know the location of such device or vehicle. The handheld communication device 101 may comprise a global navigation satellite system (GNSS) receiver having a configurable RF path that may be operable to receive medium Earth orbit (MEO) satellite signals and low Earth orbit (LEO) satellite signals. In another exemplary scenario, the wireless communication device 101 may comprise two RF paths to receive different satellite signals.

The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as Iridium satellite phones, whereas the MEO satellites 105 may be utilized for location and navigation applications.

In certain circumstances, MEO signals, such as GPS signals, may be attenuated by buildings or other structures to such an extent that GPS receivers cannot obtain a lock to any GPS satellites. However, due to the stronger signal strength of LEO satellite signals, the LEO signals may be utilized by devices to supplement or substitute the MEO satellite signals in the devices. However, the frequencies utilized for MEO and LEO satellite communication are not the same, so a conventional GPS receiver cannot process LEO signals.

In an exemplary embodiment, the wireless communication device 101 may be operable to receive both LEO satellite signals, such as Iridium signals, and MEO signals, such as GPS signals. In this manner, the receiver may be able to determine the user's location despite having high attenuation of GPS signals to below that of the sensitivity of a conventional GPS receiver. Thus, the wireless communication device 101 may be able to accurately determine its location by receiving either or both Iridium and GPS satellite signals. This may be enabled by utilizing separate RF paths, one path configured to receive MEO signals and the other path configured to receive LEO satellite signals.

In an exemplary scenario, the two separate RF paths may share some front-end components, such as an antenna, low-noise amplifier (LNA), and a splitter, for example. In this scenario, the shared front-end components may comprise enough bandwidth to process both MEO and LEO signals. In another exemplary scenario, the wireless device may utilize separate front-end components. Furthermore, in instances where only one type of signal is to be received, the inactive RF path may be powered down to conserve power.

In yet another exemplary scenario, the separate RF paths may be time-division duplexed (TDD), or selectively enabled, such that both MEO and LEO signals may be received, but at alternating times. This may enable MEO-assisted LEO positioning or LEO-assisted MEO positioning, for example. The wireless communication device 101 may comprise a blanking or switching module for enabling TDD signal reception, where the TDD process may be carried out in the digital domain. For example, the MEO, or GPS, processing path may be blanked, i.e. set to and held at the last sampled value, while the LEO path receives and demodulates LEO signals.

Determining the location of the wireless device using stronger LEO satellite signals, particularly when coarse location is acceptable, uses much less power than weaker MEO (e.g. GPS) satellite signals, particularly with fine location calculations. Further power savings, in devices that also include a WiFi interface, may be enabled by disabling the WiFi RF and processor circuitry in the wireless device and configuring the WiFi circuitry to only activate when in the vicinity of a known or trusted WLAN. Trusted WLAN may comprise networks where the user of the wireless device has an authorized account, such as at a home or work location, or at a location frequented by the user, such as a coffee shop or hotel.

The wireless communication device 101 may be operable to switch certain functionality and/or circuitry off and on based on a sleep schedule. For example, Rx circuitry in the LEO signals receiver path may be switched off during times when the sleep schedule indicates that no LEO satellite bursts are to be received. Furthermore, in the case of a dual LEO/MEO receiver, RF circuitry in the MEO signal receiver path may be switched off when the received MEO signals are below the sensitivity level. In this case, only the LEO signals receiver path may be enabled. The sleep schedule may be configured based on a desired accuracy, where fewer bursts and/or satellites may be utilized for lower accuracy requirements. Similarly, memory blocks may be powered down when lower accuracy, and thus lower burst count, operation is acceptable.

In an exemplary scenario, a LEO satellite burst schedule may be configured by the wireless communication device 101, and may include information regarding burst times and satellite identification for these bursts. The sleep schedule may be determined from the LEO burst schedule, whereas fewer bursts, satellites, and/or beams from the satellites may be selected, monitored, or tracked, for lower accuracy position requirements, and more bursts, satellites, and/or beams selected, monitored, or tracked for higher accuracy positioning.

Figure 1B:
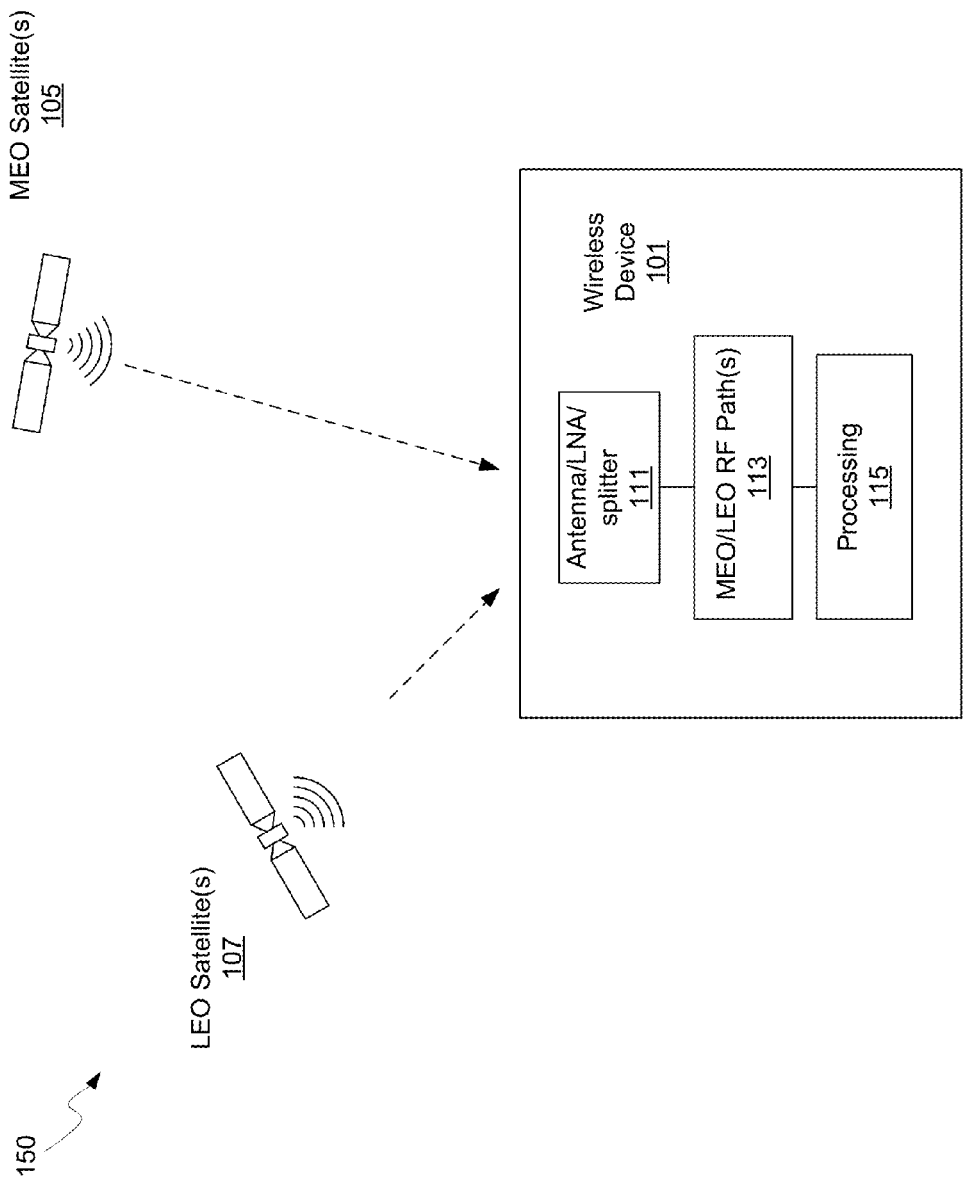
FIG. 1B is a block diagram of an exemplary dual mode global navigation satellite system for automated syncing in accordance with an embodiment of the invention.

FIG. 1B is a block diagram of an exemplary dual mode global navigation satellite system for automated syncing in accordance with an embodiment of the invention. Referring to FIG. 1B, there is shown a global navigation satellite system 150 comprising the wireless communication device 101, MEO satellites 105, and LEO satellites 107.

The wireless communication device 101 may comprise common RF front end elements such as an antenna/low-noise amplifier (LNA)/signal splitter 111. The wireless device 101 may also comprise configurable or dual MEO/LEO RF paths 113, and a processing block 115.

The configurable or dual MEO/LEO RF paths 113 may comprise amplification, down-conversion, filtering, and analog-to-digital conversion capability for received MEO and LEO signals. The processing block 115 may comprise one or more CPUs (e.g. a RISC CPU) for demodulating signals and calculating positioning information, for example. Furthermore, the processing block 115 may be operable to configure the number of LEO satellites 107 utilized for determining position. For example, if coarse location is acceptable and low power usage is desired, LEO signal bursts from a lower number of satellites may be utilized.

In an example embodiment, the LEO signal path may be utilized to enhance the geo-location capability of the MEO signal path, by extracting timing information and rough position information from the LEO signals during one or multiple bursts. In this way, for example, the MEO cold start time may be reduced to the warm start time. Thus, less time/power is spent having the MEO signal path turned on.

Furthermore, the processing block 115 may be operable to switch certain functionality and/or circuitry off and on based on a sleep schedule. For example, Rx circuitry such as the configurable or dual MEO/LEO RF paths 113 may be switched off during times when the sleep schedule indicates that no LEO satellite bursts are to be received or MEO satellite signals are too weak to be tracked. The sleep schedule may be configured based on a desired accuracy, where fewer LEO bursts and/or satellites and/or a lower duty cycle for tracking MEO signals may be utilized for lower accuracy requirements. Similarly, memory blocks may be powered down when lower accuracy, and thus lower burst count, operation is acceptable.

In an exemplary scenario, a satellite burst schedule may be configured by the processing block 115, and may include information regarding LEO burst times and satellite identification for these bursts. The sleep schedule may be determined from the burst schedule, whereas fewer bursts, satellites, and/or beams from the satellites may be selected, monitored, or tracked, for lower accuracy position requirements, and more bursts, satellites, and/or beams selected, monitored, or tracked, for higher accuracy positioning.

FIG. 1C is a schematic illustrating power optimization of a low Earth orbit satellite receiver, in accordance with an embodiment of the invention. Referring to FIG. 1C, there is shown the wireless device 101, MEO satellites 105, and LEO satellites 107.

In an exemplary scenario, 2-5 bursts from one or more of the LEO satellite 107 may be received by the wireless communication device 101 over a few seconds. The burst may be down-converted and demodulated to extract an accurate clock and satellite orbital data. These may be communicated to a position engine that may calculate the position. Furthermore, once the satellite orbital data is extracted, the Doppler shift may be calculated from the received burst intervals compared to the actual burst intervals, which are known for each satellite.

The extracted clock may be utilized to calibrate the LO/PLL and/or TCXO timing circuits in the wireless communication device 101. This may allow the RF receive paths to power down more frequently, particularly the MEO (e.g. GPS) RF paths, since it would not be needed to calibrate the timing circuits. In addition, the LEO-path derived timing calibration might allow the MEO signal path to be tracking satellites intermittently at a lower duty cycle, so as to trade off power with position accuracy.

In another exemplary scenario, the wireless communication device 101 may receive a code from one or more of the LEO satellites 107 that indicates an approximate location, for example a code that indicates that the satellite is currently over the United States, or a particular region of the country, which may enable the device to first establish a coarse position, perhaps in conjunction with a previously calculated position, which may then be further zoomed in to the actual position.

In an exemplary scenario, the wireless communication device 101 may optimize its power usage based on the desired accuracy of the calculated position. Better accuracy may be obtained with multiple satellites, but the duty cycle increases and thus results in higher power usage. The wireless communication device 101 may be operable to choose between multiple satellites for high accuracy, and thus use more power, or coarse positioning with fewer satellites and using lower power. The wireless communication device 101 may be operable to use the satellite with the highest receive power, and when it disappears, the wireless communication device 101 may switch to the next visible satellite with the highest signal strength.

Figure 1D:
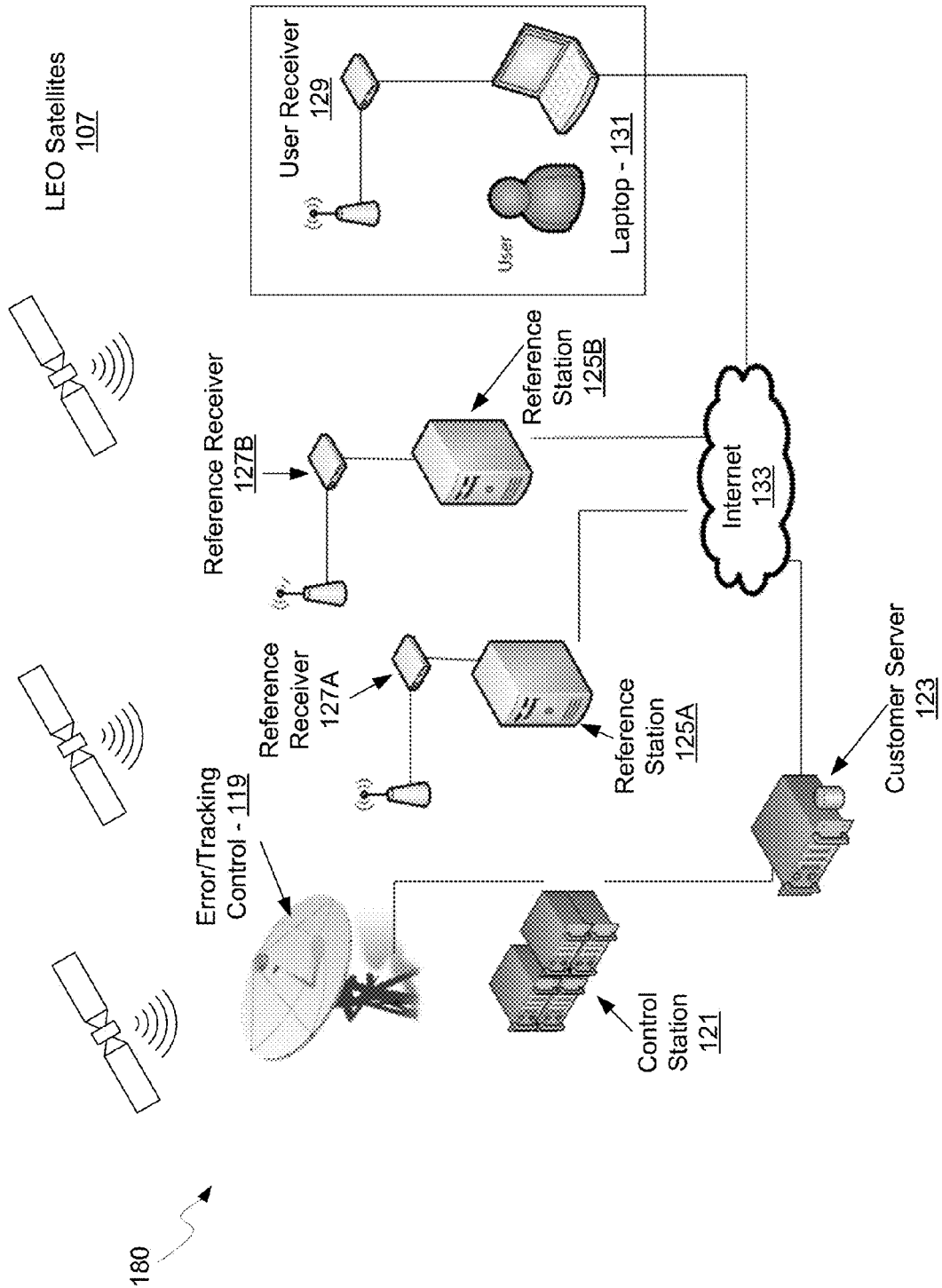
FIG. 1D illustrates an exemplary low Earth orbit satellite system, in accordance with an embodiment of the invention.

FIG. 1D illustrates an exemplary low Earth orbit satellite system, in accordance with an embodiment of the invention. Referring to FIG. 1D, there is shown an LEO satellite system 180 comprising LEO satellites 107, satellite error/tracking control 119, a control station 121, a customer server 123, reference stations 125A and 125B, reference receivers 127A and 127B, a user receiver 129, a laptop 131, and the Internet 133.

The satellite error/tracking control 119 may comprise a satellite dish for tracking the orbits of the LEO satellites 107. Slight inaccuracies in the satellite orbits as compared to their expected trajectories may result in significant positioning errors of devices that utilize the LEO satellites 107. The control station 121 may comprise a plurality of servers, for example, that may be operable to communicate with the satellite error/tracking control 119, and may store orbit and satellite and burst schedule.

The customer server 123 may comprise a server of a provider of satellite data for customer positioning applications. Accordingly, the customer server 123 may communicate with the control station 121 to obtain desired orbit and satellite burst schedule data for use by users. The customer server 123 may be communicatively coupled via the Internet 133 to the reference stations 125A and 125B, which may be operable to calculate reference pseudo-range and Doppler shift at reference positions. This information may be utilized by user receivers for positioning purposes.

The reference receivers 127A and 127B may comprise GNSS receivers for receiving signals from MEO satellite signals. Because the position of the reference receivers 127A and 127B is known, the reference receivers 127A and 127B and reference stations 125A and 125B may be operable to provide accurate satellite ephemeris data for user GNSS receivers that may correspond to a region within a certain radius of the reference receivers 127A and 127B.

The LEO satellites 107 may transmit time information in a burst. LEO satellite receivers may see up to 3 satellites, and since the satellites are low orbit, one passes overhead rather frequently, e.g., almost every 15 minutes in the case of Iridium LEO satellites.

In an exemplary scenario, the reference base stations 125A and 125B may calculate expected pseudo-range and Doppler shift, at a known reference position of the reference receivers 127A and 127B, for example. These corrections may then be sent to the user's LEO receiver system 129, which may then subtract differential corrections from the measured pseudo-range and Doppler shift. The differential corrections may be calculated at the reference stations 125A and 125B or locally. The differential corrections may correct satellite clock errors, orbit/ephemeris errors, and atmospheric errors.

The orbit data may comprise polynomial fit coefficients (ephemerides) and geo-location parameters. In an exemplary scenario, the orbit files may be valid for approximately 4 hours, but updates may be available every hour, based on exact measurements by base stations.

A satellite burst schedule, or MDO file, may comprise the association between a burst ID, the transmitting LEO satellite ID during that burst and its active beam IDs and thus may provide useful information for estimating attenuation. In an exemplary scenario, the MDO files may be available every 24 hours. The received and computed information may be co-related to the orbit and MDO data to compute the position of a user receiver.

Figure 2A:
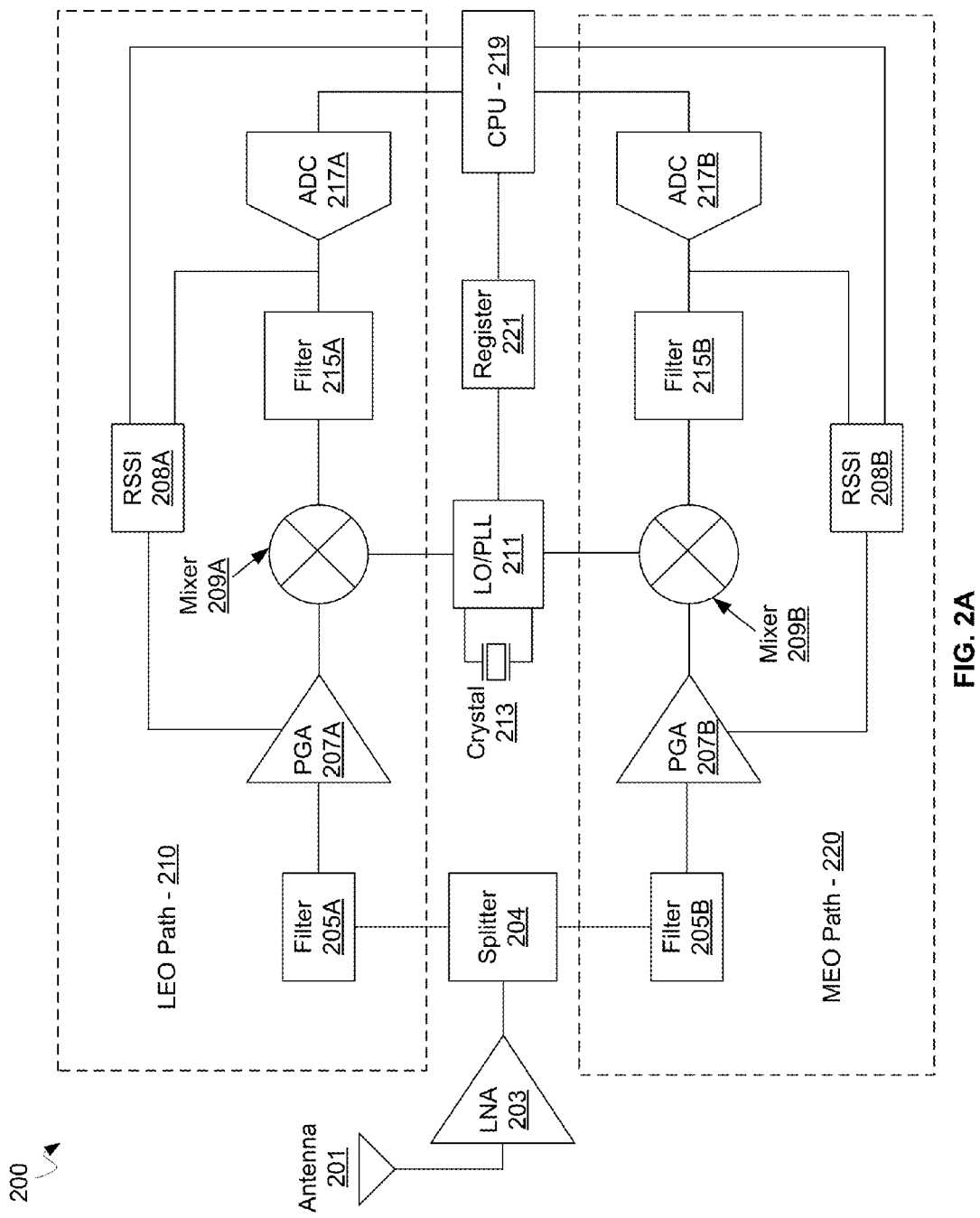
FIG. 2A is a diagram illustrating an exemplary dual mode radio frequency receiver, in accordance with an embodiment of the invention.

FIG. 2A is a diagram illustrating an exemplary dual mode radio frequency receiver, in accordance with an embodiment of the invention. Referring to FIG. 2, there is shown a receiver 200 comprising an antenna 201, a low noise amplifier (LNA) 203, a signal splitter 204, a LEO path 210, a MEO path 220, a local oscillator (LO)/phase locked loop (PLL) 211, a crystal oscillator 213, a central processing unit 219, and a register 221.

The LEO path 210 and MEO path 220 may comprise similar components, configured for different frequencies as needed, such as a programmable gain amplifiers (PGAs) 207A and 207B, receive signal strength indicator modules (RSSI) 208A and 208B, mixers 209A and 209B, filters 205A 205B, 215A, and 215B, and analog-to-digital converters (ADCs) 217A and 217B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the splitter 204. The LNA 203 may have a wide enough bandwidth to amplify both MEO and LEO satellite signals.

The signal splitter 204 may be operable to communicate part of the signal received from the antenna 201 to the LEO path 210 and part to the MEO path 220. This may be achieved by splitting the signal at a certain percentage to each path, such as 50%/50%, for example, or may split the received RF signal based on frequency, such that only MEO signals are communicated to the MEO path 220 and only LEO signals are communicated to the LEO path 210.

The filters 205A and 205B may comprise active or passive filters and may be operable to attenuate signals at frequencies outside a desired range and allow desired signals to pass. For example, the filter 205A may pass LEO satellite signals while filtering out MEO signals. The filter modules 205A and 205B may comprise active and/or passive filters for removing unwanted signals while allowing desired signals to pass to the PGAs 207A and 207B. In an exemplary scenario, the filter modules 205A and 205B comprises surface acoustic wave (SAW) filters.

The PGAs 207A and 207B may provide amplification to signals received from the filters 205A and 205B, and may be configured to operate at MEO or LEO frequencies, or may operate over both frequency ranges. For example, the PGA 207 may be configured by a processor, such as the CPU 219.

The RSSI modules 208A and 208B may comprise circuitry for determining the magnitude of a received signal, and may sense signal strengths at the PGAs 207A or 207B or for down-converted signals after the filters 215A and 215B, for example. Accordingly, the RSSI modules 208A and 208B may be operable to sense signal strength at any point along the RF paths in the receiver 200.

The mixers 209A and 209B may comprise circuitry that is operable to generate output signals at frequencies that are the sum and the difference between the input RF signals and the local oscillator signal received from the LO/PLL 211. In an exemplary scenario, the LEO path 210 and the MEO path 220 may comprise two paths each to enable the reception of in-phase and quadrature (I and Q) signals. Accordingly, the mixers 209A and 209B may each comprise two mixers, each receiving LO signals with 90 degree phase difference to the other mixer of the pair.

In another exemplary scenario, the mixer 209 may down-convert the received RF signals to an intermediate frequency (IF) for further processing, as opposed to down-converting directly to baseband. In this scenario, the filter modules 215A and 215B may comprise a bandpass filter that is configured to pass the desired IF signals while filtering out the undesired low and high frequency signals.

The LO/PLL 211 may comprise circuitry that is operable to generate RF signals to enable down-conversion of RF signals received by the mixers 209A and 209B. The LO/PLL 211 may comprise a voltage-controlled oscillator, for example, with a PLL to stabilize the frequency of the output signal communicated to the mixers 209A and 209B. In an exemplary scenario, the LO/PLL 211 may generate a plurality of LO signals for down-converting I and Q signals in the LEO path 210 and the MEO path 220.

The crystal oscillator 213 may comprise a stable clock source for the receiver 200, and may comprise a piezoelectric crystal, for example, that outputs a stable clock signal at a given temperature. The crystal oscillator 213 may comprise a source for the various LO signals to be communicated to the mixers via the LO/PLL 211.

The ADCs 217A and 217B may comprise circuitry that is operable to convert analog input signals to digital output signals. Accordingly, the ADCs 217A and 217B may receive baseband or IF analog signals from the mixers 209A and 209B and may generate digital signals to be communicated to the CPU 219.

The CPU 219 may comprise a processor similar to the processor 115, for example, described with respect to FIG. 1B. Accordingly, the CPU 219 may be operable to control the functions of the receiver 200 and may process received digital baseband or IF samples to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data.

The CPU 219 may receive RSSI information from the RSSI modules 208A and 208B and may control the gain of the various gain stages in the Rx paths. Similarly, the CPU may control the LO/PLL 211 via the register 221.

The register 221 may comprise a memory register for storing a configuration to be communicated to the LO/PLL to down-convert MEO and/or LEO signals. The register 221 may communicate an output signal to the LO/PLL 211 that indicates the desired frequency signals to down-convert the received RF signals to IF or baseband.

In an exemplary scenario, the receiver 200 may be operable to receive both MEO and LEO satellite signals for positioning purposes. In this manner, the wireless device that comprises the receiver 200 may be capable of determining its position even within a structure that attenuates GPS signals. Accordingly, a plurality of positioning-based applications may be performed. For example, the positioning function may be operable to power on and off WiFi circuitry based on the known locations of trusted WiFi networks and a determined position of the wireless device using LEO satellite signals.

In an exemplary scenario, 2-5 bursts from the LEO satellite may be received by the wireless device over a few seconds. The bursts may be down-converted and demodulated to extract an accurate clock and satellite orbital data. These may be communicated to a position engine that may calculate the position. Furthermore, once the satellite orbital data is extracted, the Doppler shift may be calculated from the received burst intervals compared to the actual burst intervals, which are known for each satellite.

The extracted clock may be utilized to calibrate the LO/PLL 211 and/or TCXO timing circuits 213 in the wireless communication device 101. This may allow the RF receive paths 210 and 220 to power down occasionally, particularly the MEO (e.g. GPS) RF path 220, since it would not be needed to calibrate the timing circuits. In addition, the LEO-path derived timing calibration might allow the MEO signal path to be tracking satellites intermittently at a lower duty cycle, so as to trade off power with position accuracy.

In yet another exemplary scenario, the receiver 200 may enable MEO and LEO positioning to switch certain functionality and/or circuitry off and on based on a sleep schedule. For example, the Rx circuitry 210 and 220 may be switched off during times when the sleep schedule indicates that no LEO satellite bursts are to be received or MEO satellite signals are too weak to be tracked. The sleep schedule may be configured based on a desired accuracy, where fewer LEO bursts and/or satellites and/or a lower duty cycle for tracking MEO signals may be utilized for lower accuracy requirements. Similarly, memory blocks may be powered down when lower accuracy, and thus lower burst count, operation is acceptable.

Figure 2B:
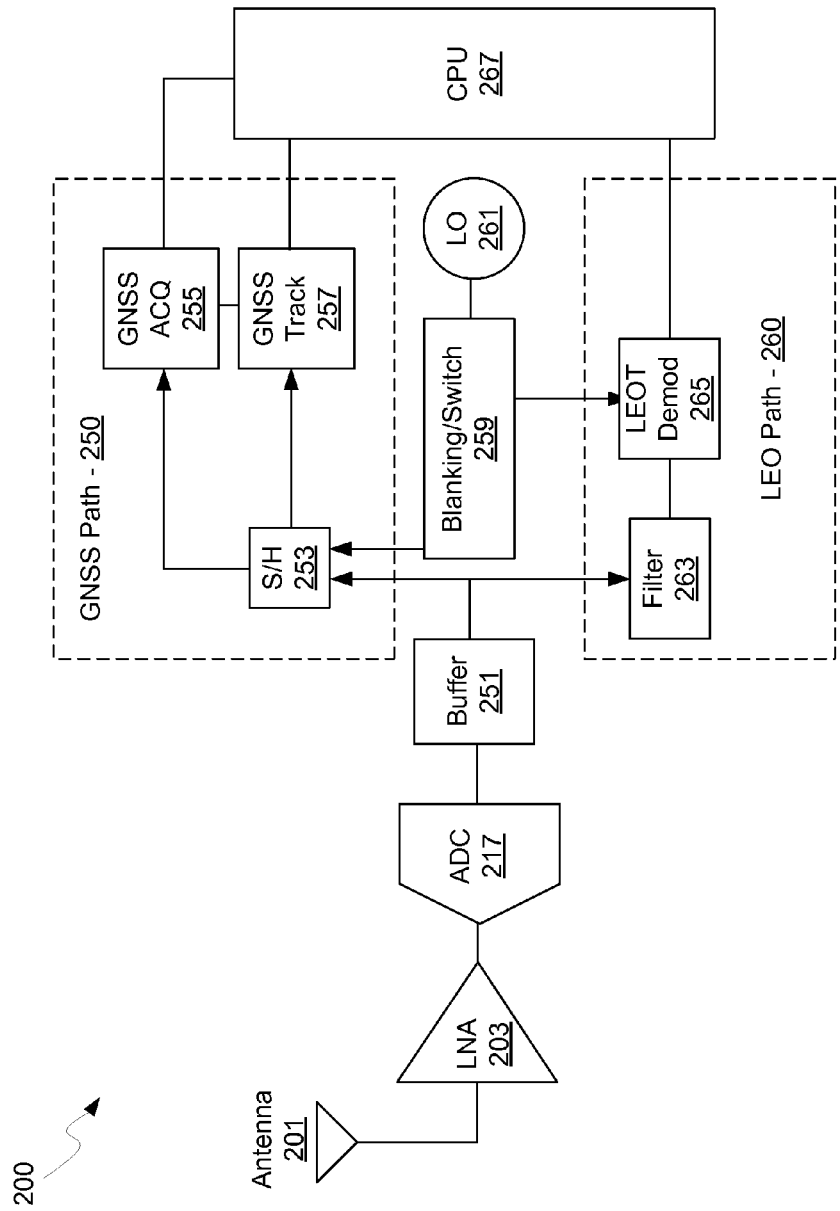
FIG. 2B is a block diagram illustrating a dual-mode time-division duplex satellite receiver, in accordance with an embodiment of the invention.

FIG. 2B is a block diagram illustrating a dual-mode time-division duplex satellite receiver, in accordance with an embodiment of the invention. Referring to FIG. 2B, there is shown an exemplary receiver 200 comprising an antenna 201, a low-noise amplifier (LNA) 203, an analog-to-digital converter (A/D) 217, a buffer 251, and two paths, a MEO path 250, and a LEO path 260. There is also shown a blanking/switch module 259, a LO/PLL 261 and a central processing unit (CPU) 267.

The MEO path 250 may comprise a sample and hold (S/H) module 253, a GNSS acquisition module 255, and a GNSS tracking module 257. The S/H module 253 may be operable to sample the digital signal from the buffer 251, and hold the sampled value for a configurable time, which may be communicated to the GNSS acquisition module 255 and the GNSS tracking module 257. The S/H module 253 may thus act as a gatekeeper for data to the GNSS acquisition module 255 and the GNSS tracking module 257. This may enable the receiver 250 to switch between MEO and LEO signals without losing a MEO value when receiving LEO signals, for example, and avoid the divergence of the output of the GNSS acquisition module 255 and the GNSS tracking module 257. In another exemplary scenario, the S/H module 253 may output a constant value, a string of zeroes, for example, or any known pattern to avoid divergence of the output of the GNSS acquisition module 255 and the GNSS tracking module 257.

The GNSS acquisition module 255 may be operable to acquire a lock to one or more GNSS satellites, which may allow the GNSS tracking module 257 to determine and track the location of the receiver. The GNSS acquisition module 255 may detect MEO frequency signals above a threshold signal strength and extract an accurate clock by determining the code-division multiple access (CDMA) coarse acquisition (C/A) code for the received data. A determined satellite ID and C/A code may be used by the GNSS tracking module 257 for accurate positioning purposes.

Similarly, the LEO path 260 may comprise a filter 263 and a LEO timing signal demodulator module 265. The LEO timing signal demodulator module 265 may receive filtered LEO signals from the filter 263 and may demodulate the received signal to an accurate clock from the transmitting satellite. This accurate clock along with information regarding the satellite orbit may be utilized for positioning. In this manner either MEO or LEO signals, or both, may be utilized for positioning purposes.

The LEO timing demodulator 265, the GNSS acquisition module 255, and the GNSS tracking module 257 may communicate output signals to the CPU for further processing or use of the determined timing and/or positioning data.

The blanking/switching module 259 may be operable to provide the TDD function for the receiver, switching the LEO path 260 on and off and blanking the MEO path 250 by configuring the output of the S/H module 253 to retain the previous data to the GNSS acquisition module. The LO/PLL 261 may provide a timing signal for the blanking/switch module.

The filter 263 may be operable to filter out unwanted signals allowing the desired satellite RF signal to pass to the LEOT demodulator module 265. The LEO timing demodulator may be operable to extract an accurate timing signal from the received LEO signals, which along with satellite ephemeris data, may be utilized by the CPU 267 for positioning purposes.

Figure 3:
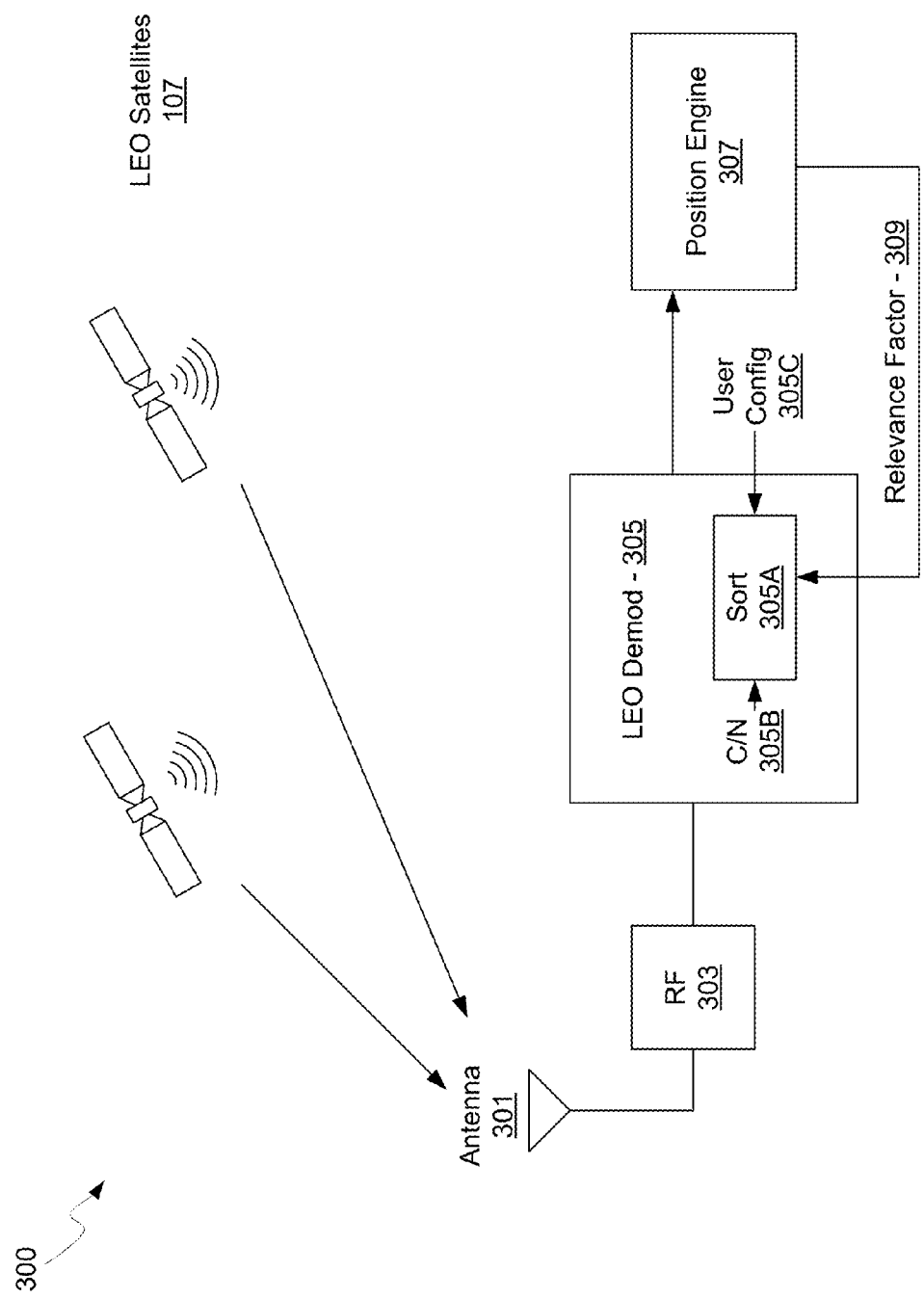
FIG. 3 is a schematic illustrating an exemplary satellite selection system, in accordance with an embodiment of the invention.

FIG. 3 is a schematic illustrating an exemplary satellite selection system, in accordance with an embodiment of the invention. Referring to FIG. 3, there is shown satellite selection system 300 an antenna 301, an RF module 303, a LEO satellite signal demodulation module 305, and a position engine 307. The RF module 303 may comprise circuitry for receiving, amplifying, and down-converting received satellite signals. The RF module 303 may be communicatively coupled to the LEO demod module 305 for subsequent demodulation.

The LEO demod module 305 may comprise suitable circuitry, logic, and/or code for tracking LEO satellite bursts and may comprise a sort engine 305A. The sort engine 305A may comprise a sort algorithm for determining which satellites the wireless device 101 may utilize for positioning purposes.

The position engine 307 may comprise suitable circuitry, logic, and/or code for calculating a global position based on received satellite signals demodulated by the LEO demod module 305. The position engine 307 may also be operable to communicate a relevance factor 309 to the sort module 305A in the LEO demod module 305.

In operation, the antenna 301 may receive satellite signal bursts from a plurality of LEO satellites 107, the RF module 303 may amplify, filter, and down-convert the received signals to baseband, and the LEO demod module 305 may demodulate the down-converted signals to extract satellite ID codes, clocks, and other data relevant to positioning.

Intervals between bursts may comprise possible sleep times in which the RF module 303 and the demodulation circuitry 305 may be powered down. The sort engine 305A in the LEO demod module 305 may receive a relevance factor 309 from the position engine 307, where the relevance factor 309 may specify the relevance of a given satellite signal for calculating position. The relevance factor 309 may be inversely proportional to an accuracy range from the calculated position and may be based on how the filter converges in the positioning calculation in the position engine 307. If the relevance is approximately 1, it contributes greatly to position accuracy, and if the relevance is approximately 0, it does not contribute significantly. In another embodiment, the position engine 307 may output a list of visible satellites sorted by the highest to lowest impact on position accuracy.

The sort algorithm utilized by the sort module 305A may be based on user configuration input and/or the relevance factor 309. The user configuration 305C may comprise a low power mode or a high accuracy mode, where in the low power mode, only satellites with a high or a highest modulated signal to noise ratio (C/N) 305B are used for a period of time, $T_{conf}$. During a select period, $T_{select}$, all satellite bursts may be considered to pick the high or highest C/N satellite and/or to discard satellites with low relevance. This relevance information may be fed back from the position engine 307. Furthermore, the algorithm may be forced to use a particular satellite or satellites by user configuration 305C or based on position engine feedback. Exemplary timing diagrams are illustrated in FIGS. 5 and 6.

The position engine 307 may calculate the position with all incoming bursts and extract latitude, longitude, and position error covariance. The position engine 307 may iterate the position calculation by removing satellites, and repeat with all combinations of the satellites in view. The results may be sorted by relevance—i.e., which satellite burst combination gives the most accurate position. The resulting relevance factor 309 may be fed back to the sort engine 305A at baseband to discard low relevance satellites and thus save power. This process may be an iterative process in software or a combination of software and hardware, and the position engine 307 may be configured to extract satellite relevance in a shorter iteration.

Figure 4:
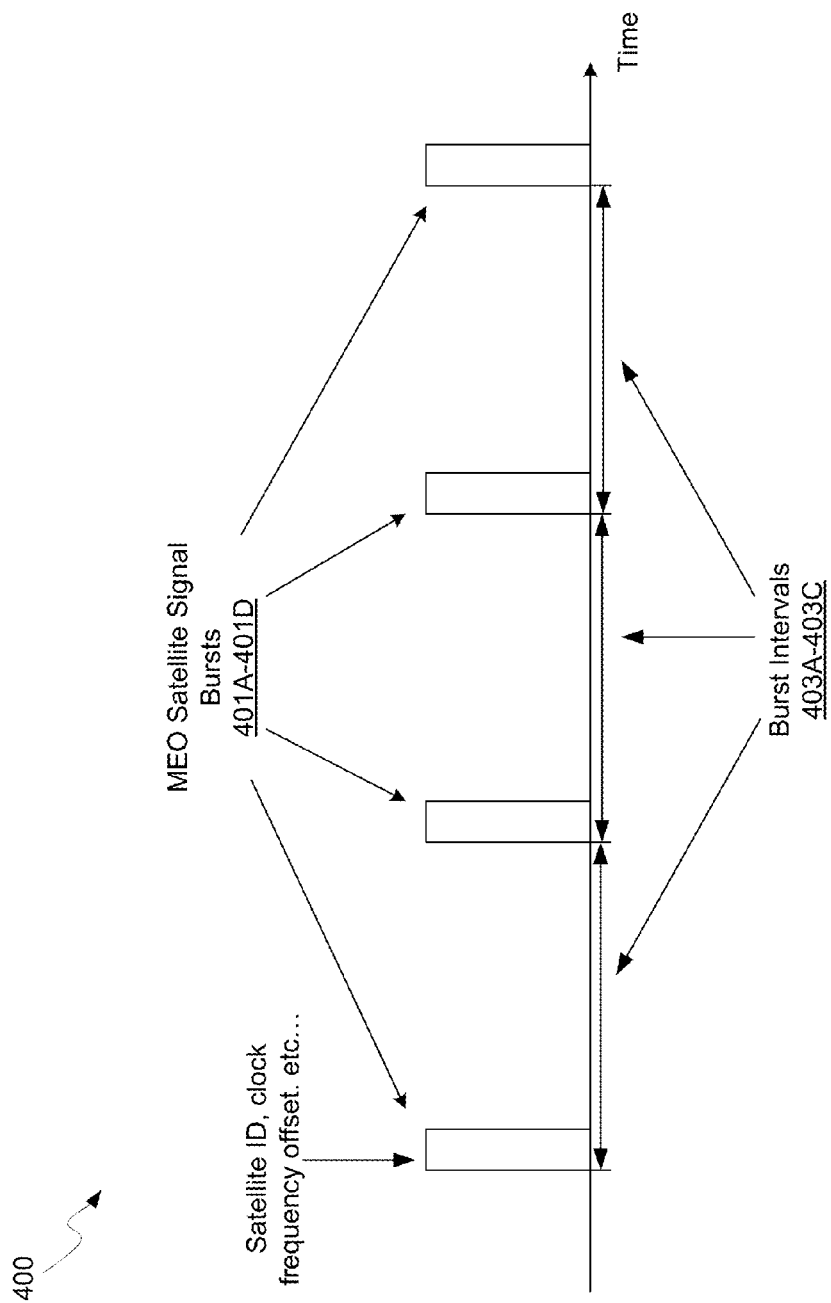
FIG. 4 is a schematic illustrating a LEO-assisted GNSS receiver hot start, in accordance with an embodiment of the invention.

FIG. 4 is a schematic illustrating a timing diagram for low Earth orbit satellite signals, in accordance with an embodiment of the invention. Referring to FIG. 4, there is shown a satellite timing diagram 400 comprising four LEO satellite signal bursts 401A-401D separated in time by the burst intervals 403A-403C. In an exemplary scenario, a dual mode or time-division duplexed MEO/LEO RF receiver may receive the LEO bursts and demodulate them to obtain the satellite ID and the clock frequency offset. From the satellite ID, the receiver then has knowledge of that satellite's expected burst interval. By comparing the expected burst interval to the measured interval, the receiver then may calculate a Doppler shift. Each of these pieces of information may be utilized to assist the MEO position calculation (e.g. GPS). Alternatively, the LEO satellite signal burst calibration may be utilized to keep the receiver TCXO calibrated while leaving the MEO (GPS) system powered down.

Figure 5:
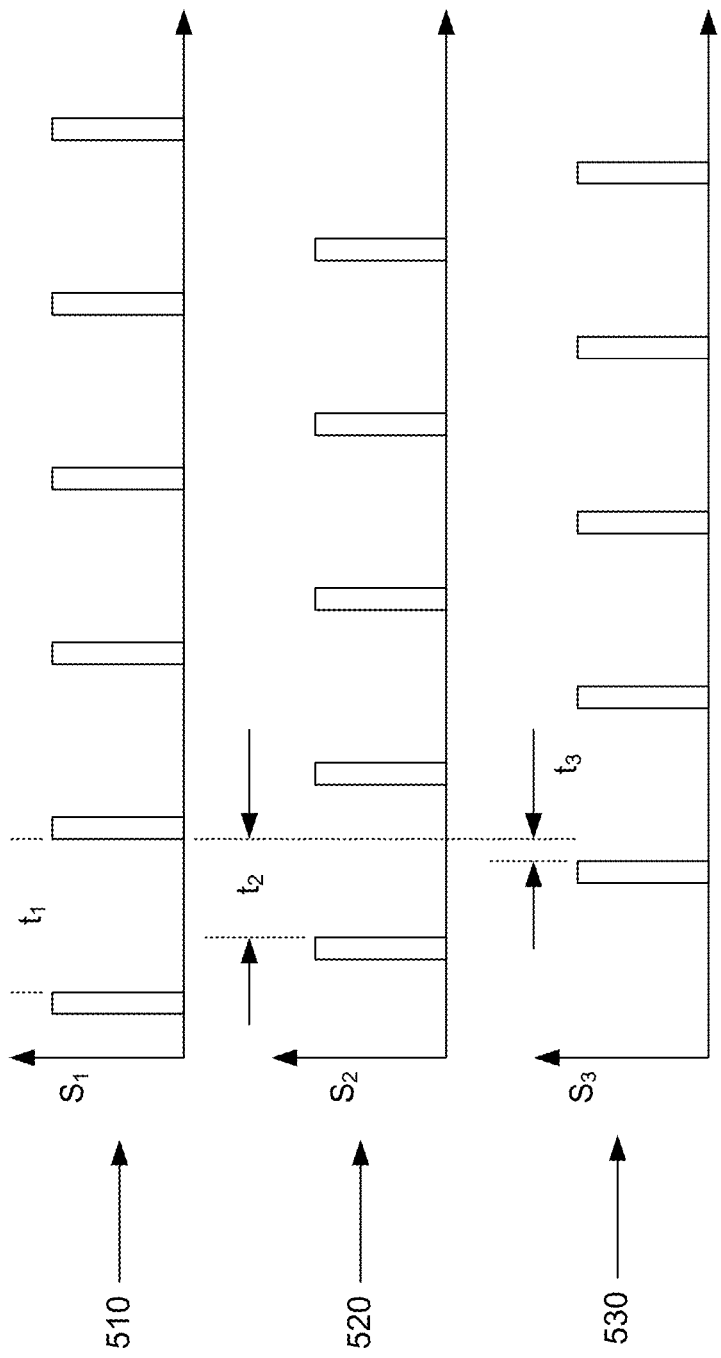
FIG. 5 is a timing diagram illustrating signal pulses from three satellite vehicles, in accordance with an embodiment of the invention.
Figure 6:
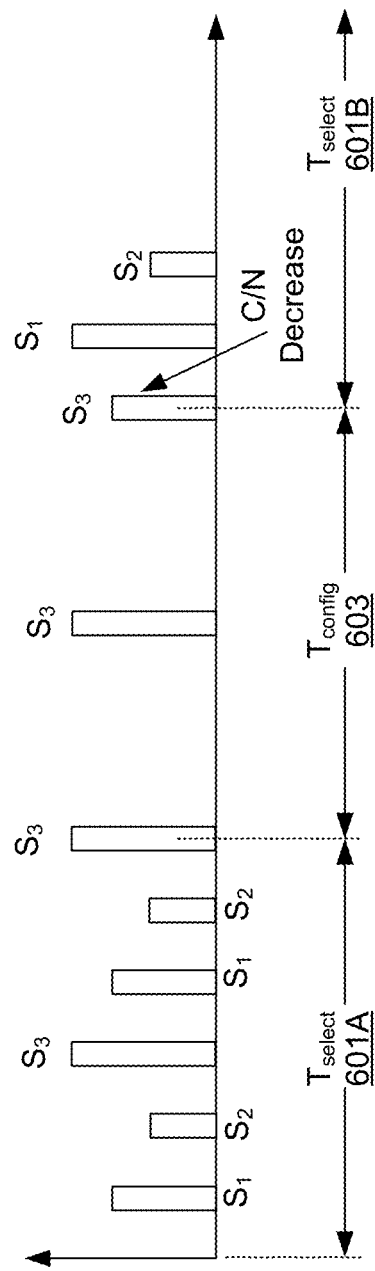
FIG. 6 is a timing diagram of signal pulses from three satellites with varying signal strengths, in accordance with an embodiment of the invention.

FIG. 5 is a timing diagram illustrating signal bursts from three satellite vehicles, in accordance with an embodiment of the invention. Referring to FIG. 5, there is shown pulses from satellites $S_1$, $S_2$, and $S_3$ versus time, labeled as timing diagrams 510, 520, and 530. The timing intervals $t_1$, $t_2$, and $t_3$ may represent intervals where RF and demod circuitry may be powered down, depending on how many of the visible satellites are being utilized. For example, if only $S_1$ is being utilized, the circuitry may be powered down for most of the interval $t_1$, depending on how quickly circuitry may be powered down and back up.

FIG. 6 is a timing diagram of signal bursts from three satellites with varying signal strengths, in accordance with an embodiment of the invention. Referring to FIG. 6, there is shown pulses corresponding to signal bursts from satellites $S_1$, $S_2$, and $S_3$ where the height of the pulses is proportional to the signal to noise ratio, or C/N, which indicates the carrier signal to noise ratio, for example. There is also shown satellite select intervals, $T_{select}$ 601A and 601B, and $T_{config}$ 603.

During the select period, $T_{select}$ 601A, all of the bursts may be received and measured to determine a C/N and relevance factor, and RF circuitry and demod circuitry may be powered down between bursts.

In an exemplary scenario, during the config interval, $T_{config}$ 603, the system may only track the selected satellite that had the strongest signal and relevance. Accordingly, where the $S_3$ satellite exhibits the highest C/N during the $T_{select}$ interval 601A, the $S_3$ satellite may be utilized for positioning purposes during the $T_{config}$ interval 603.

The highest strength signals may be reassessed during each select interval as signal strengths vary as the satellites move through their orbits. Accordingly, if, during the next $T_{select}$ interval 601B, the $S_3$ C/N decreases below that of the $S_1$ C/N, the $S_1$ satellite signal may be utilized for positioning purposes during the next $T_{config}$ interval, not shown.

Figure 7:
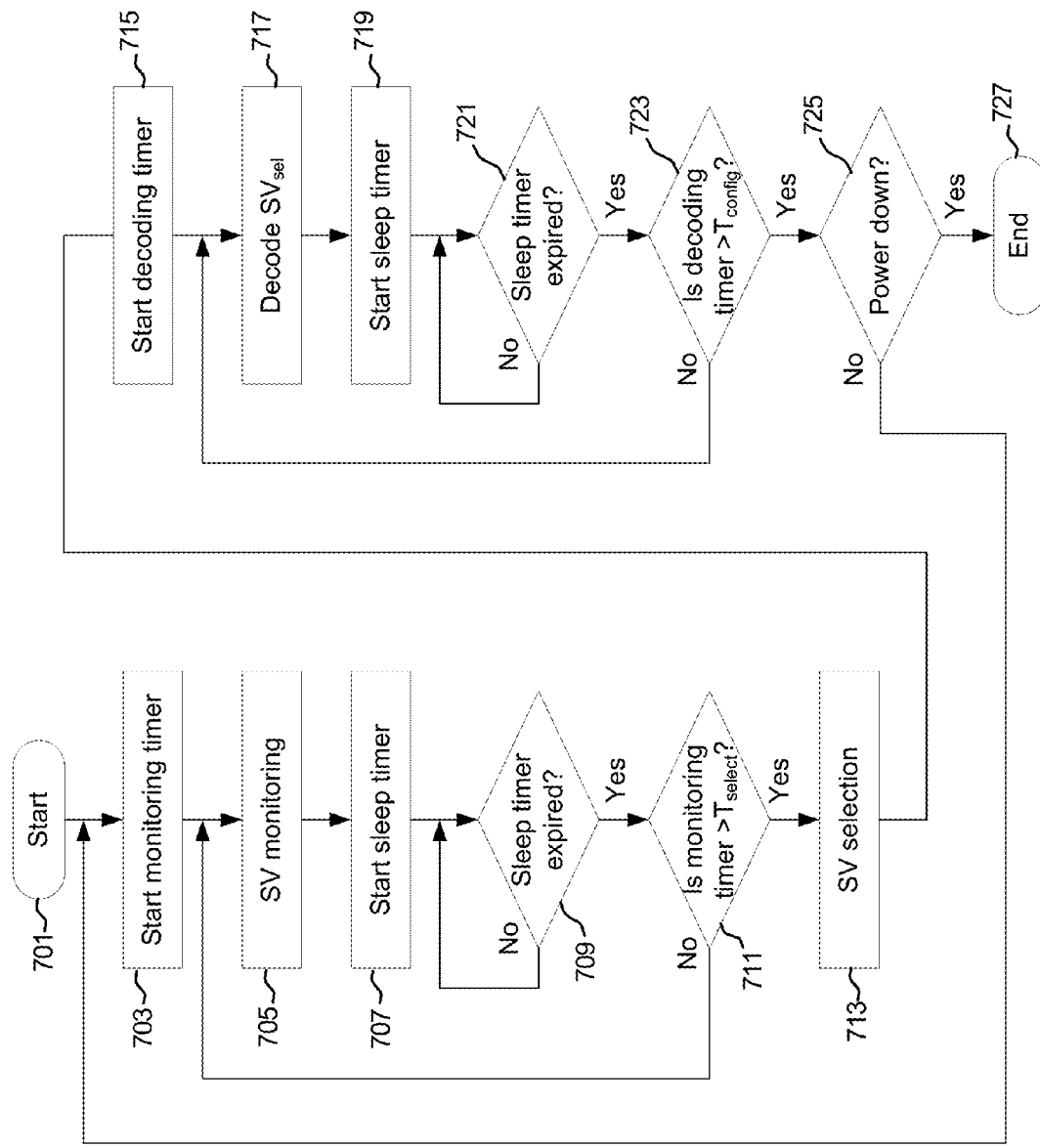
FIG. 7 is a flow diagram illustrating an exemplary satellite signal select process, in accordance with an embodiment of the invention.

FIG. 7 is a flow diagram illustrating an exemplary satellite signal select process, in accordance with an embodiment of the invention. Referring to FIG. 7, in step 703, after start step 701, a monitoring timer may be started that tracks the time spent monitoring satellite signal strength. In step 705, the signal strength of visible satellites may be monitored, followed by step 707 where a timer may be started that tracks the time at which circuitry is powered down and when it will be powered back up for the next burst of the selected satellite or satellites.

In step 709, if the sleep timer has not expired, the process may remain in step 709. Once the sleep timer has expired, the process may proceed to step 711 where the monitoring timer may be compared to the time $T_{Select}$. If the monitoring timer has not exceeded this time, the exemplary steps may loop back to step 705 for further satellite monitoring. If the monitoring timer has passed the time Tselect, the decoding timer may be started in step 715, which may monitor the time spent decoding received satellite signals.

In step 717, the received satellite signals may be decoded for positioning purposes. The sleep timer may be started in step 719, such that in step 721, if the sleep timer has not expired, the example steps may remain in step 721. Once the sleep timer has expired, the process continues with step 723, where the decoding timer may be compared to $T_{Config}$. If it has not exceeded $T_{Config}$, the process may step back to step 717 to continue decoding satellite signals.

In step 725, if the timer indicates that the $T_{config}$ interval is over and it has progressed to a $T_{select}$ interval, the process may proceed to step 725 to determine whether to power down or not. If not, the process repeats the entire process from step 703, and if so, powers down in step end step 727.

Figure 8:
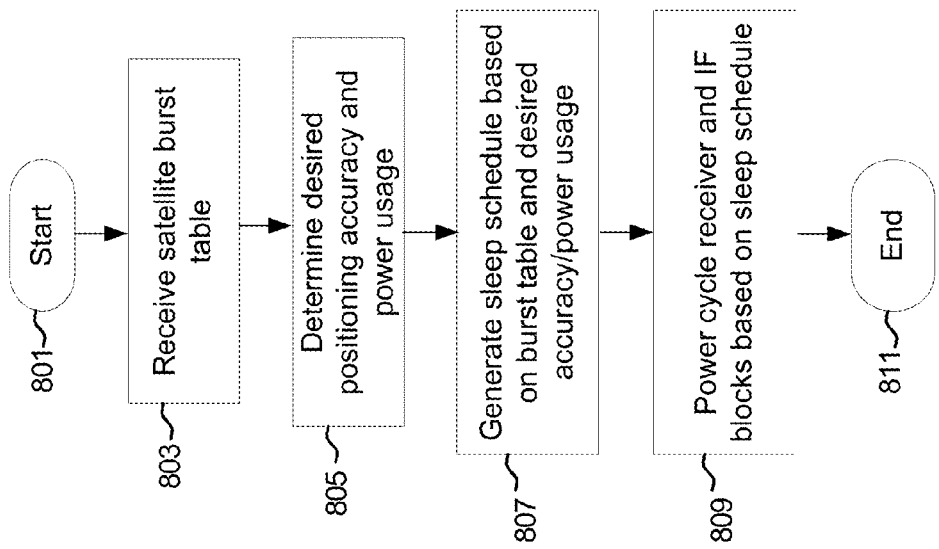
FIG. 8 illustrates exemplary steps for power saving in a low Earth orbit satellite positioning receiver, in accordance with an embodiment of the invention.

FIG. 8 illustrates exemplary steps for power saving in a low Earth orbit satellite positioning receiver, in accordance with an embodiment of the invention. Referring to FIG. 8, after start step 801, in step 803, the wireless device may receive a satellite burst table from a host server, for example. The table may comprise satellite beam and burst information that may be valid for a specific time frame in a specific geographic region based on the known satellite trajectories at any specific time, as determined by a real time clock.

In step 805, the wireless device may determine a desired positioning accuracy and power usage. For example, 100 meter accuracy may be suitable for navigating from one city to another, whereas accuracy of a few meters may be desired for short range navigation. Better accuracy is obtained by utilizing more satellites for positioning purposes, and conversely, lower power is used for lower accuracy positioning. Accordingly, if the wireless device has a nearly depleted battery but the user still wishes to determine their location, the wireless device may be configured for a lower accuracy positioning.

Based on the desired accuracy and/or power usage, in step 807 the wireless device may generate a sleep schedule that may be derived from a small subset of the received satellite burst table for lower accuracy positioning, or from a larger subset of the burst table for higher accuracy positioning. If optimal accuracy is desired, the entire burst table may be used to derive the sleep schedule.

In step 809, the wireless device may cycle positioning circuitry, such as the RF receiver, IF processing blocks, and the CPU, on and off based on the sleep schedule. The wireless device may utilize a real time clock to determine when blocks should be switched on or off. This is followed by end step 811.

Figure 9:
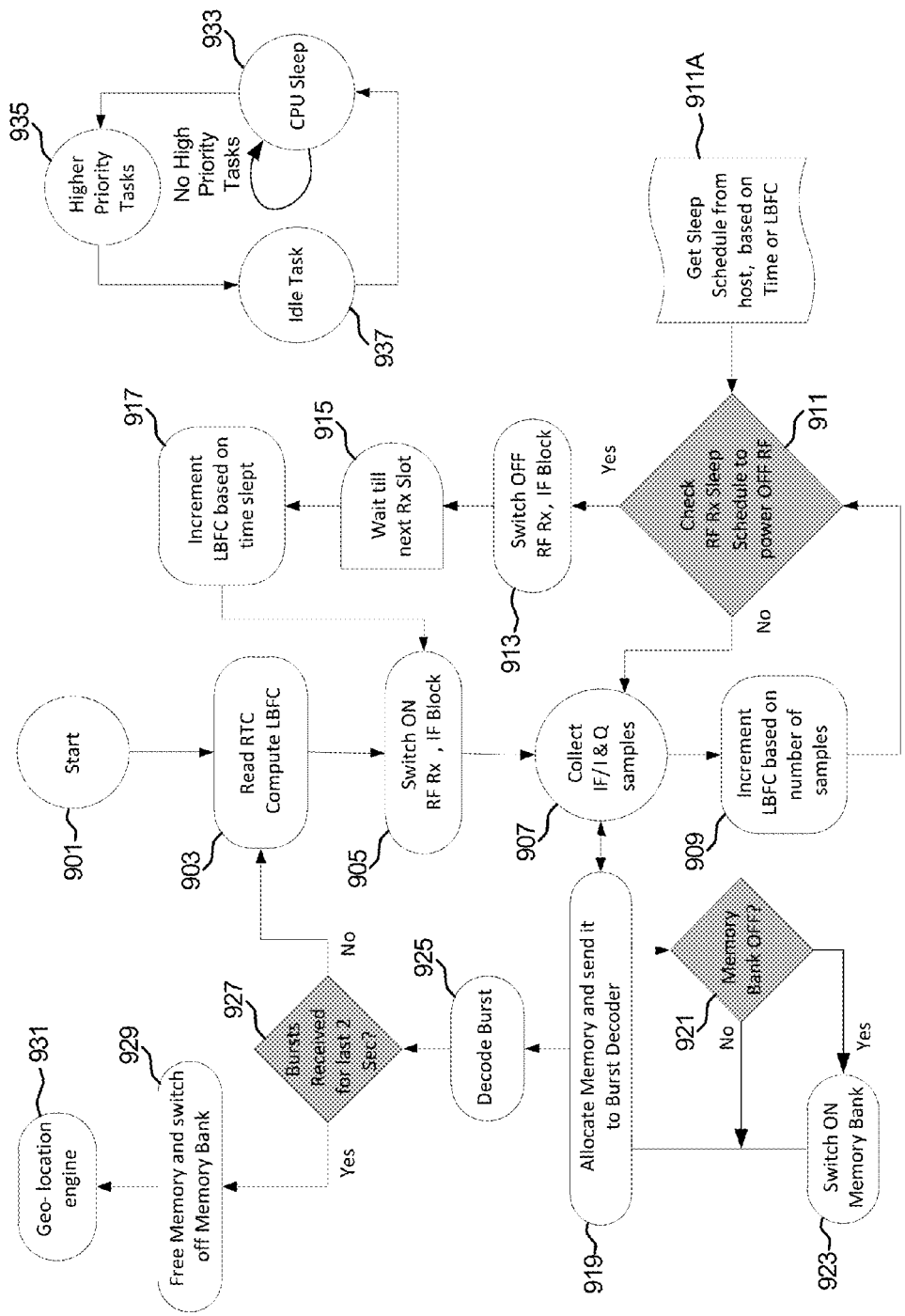
FIG. 9 illustrates exemplary steps for satellite positioning receiver sleep scheduling, in accordance with an embodiment of the invention.

FIG. 9 illustrates exemplary steps for satellite positioning receiver sleep scheduling, in accordance with an embodiment of the invention. In step 903, after start step 901, a reading of the real time clock (RTC) of the wireless device is performed. The RTC is then used to calculate the L-band frame count (LBFC), i.e., the LEO system-defined timestamp, corresponding to desired bursts in the satellite burst table. In step 905, RF receiver circuitry and the intermediate frequency (IF) blocks may then be powered up for desired bursts, followed by step 907 where the IF in-phase and quadrature (I and Q) samples may be collected. In step 909, the LBFC may be incremented accordingly.

In step 911A, the sleep schedule may be received from a host based on the time or LBFC. In another exemplary scenario, the sleep schedule may be generated by the wireless device. In step 911, the received or generated sleep schedule may be utilized to determine whether the Rx circuitry is to be powered down, and if not, the process may continue with further I and Q sample collection in step 907. If the sleep schedule indicates that no bursts are to be received, the exemplary steps may proceed to step 913 where the RF circuitry and IF block may be powered down to wait until the next Rx slot in step 915. In step 917, the LBFC may be incremented based on the time slept, before the RF circuitry and IF block are powered back up in step 905.

In parallel to the RF circuitry and IF block sleep scheduling, memory may also be configured according to a sleep schedule in step 919. When I and Q samples are collected, memory may be allocated to the samples and sent to the burst decoder in step 925. If the memory bank is off, it may be powered up to store the collected samples.

The burst may be decoded and if, in step 927, bursts have not been received for the entire last 2 seconds, for example, this indicates that the receiver may have lost track of time and is not synced to the Rx slot. The process would then proceed back to the reading of the RTC and calculation of the LBFC in step 903.

If bursts were received for the entire two seconds in step 927, the process would continue as normal where unused memory may be freed up for other purposes and/or powered down in step 929, followed by the decoded burst being communicated to the geo-location engine for positioning calculation in step 931.

Also in parallel to the RF circuitry and IF block sleep scheduling, the CPU may be put into sleep mode when no higher priority tasks are waiting, as illustrated in steps 933, 935, and 937. The CPU or other processor may remain in a sleep state when no high priority tasks are due for processing. In step 935, when a high priority task is received, the processor may wake and perform the task in step 937 before returning to sleep in step 933. The sleep schedule may correlate to the received or generated sleep schedule of the wireless device.

Figure 10:
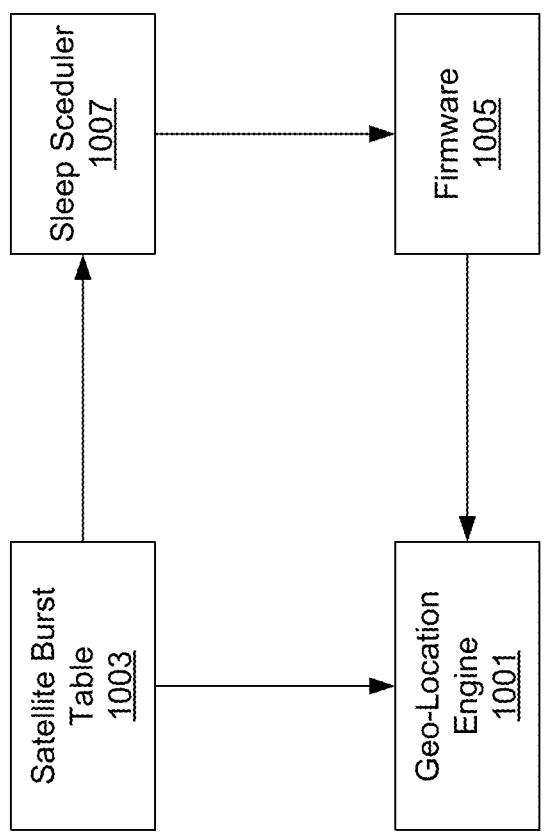
FIG. 10 is a block diagram illustrating an exemplary LEO satellite receiver information flow, in accordance with an embodiment of the invention

FIG. 10 is a block diagram illustrating an exemplary LEO satellite receiver information flow, in accordance with an embodiment of the invention. The sleep scheduler 1007 in the receiver may select which bursts to receive based on the accuracy of position needed by the receiver. This information is communicated to firmware 1005 that is utilized to control the operation of the RF circuitry and IF blocks, as described with respect to FIGS. 2A and 2B. The resulting decoded bursts may then be communicated to the geo-location engine 1001, which may also receive the MDO file, or satellite burst table 1003.

Figure 11:
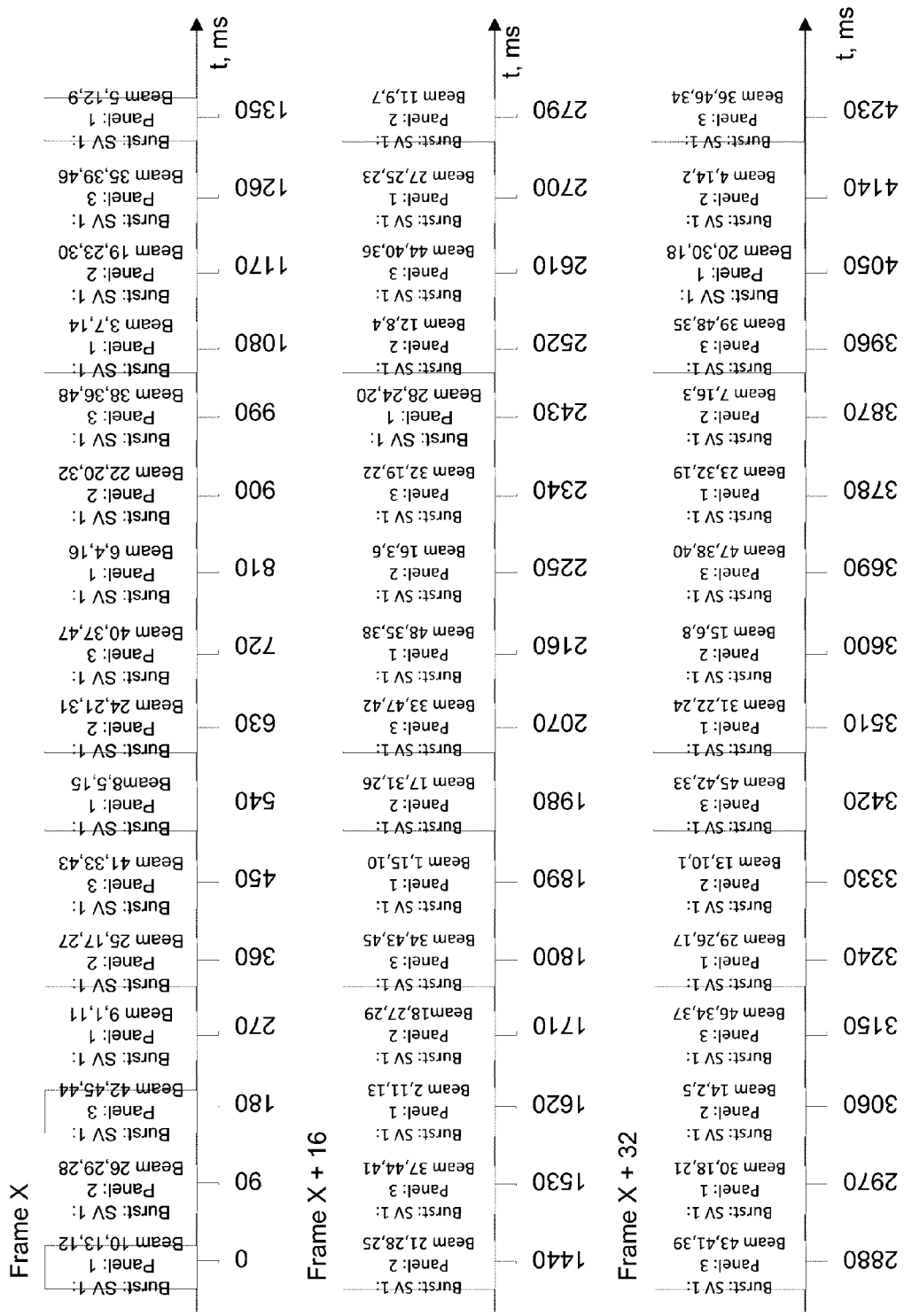
FIG. 11 is a block diagram illustrating an exemplary satellite frame sequence, in accordance with an embodiment of the invention.

FIG. 11 is a block diagram illustrating an LEO exemplary satellite frame sequence, in accordance with an embodiment of the invention. The different blocks correspond to bursts from a single satellite, while the different shades of blocks indicate different beam-sectors (panels) of a single satellite. Each satellite has 48 beams arranged as 16 beams in 3 panels. Each row of blocks corresponds to 16 consecutive bursts, each transmitted within an L-band frame; in total 48 frames are shown starting from to Frame X, Frame X+47. The LEO satellite bursts may be scheduled based on location accuracy needed and power usage. The current broadcast plan may schedule a burst to be transmitted from a single satellite beam on an average of every 1.44 seconds, which may be based on a 3 burst/frame/satellite repeat rate (i.e., three bursts transmitted simultaneously from three satellite beams per frame).

The three bursts may arrive at the same time from three beams—so bursts may be overlapping but targeted for different geo locations. If the receiver is located in-between two beam locations, it would be more likely to see both bursts and bursts from the same satellite on consecutive frames.

To cover all 48 beams/satellite, each beam would burst on average every 48/3 frames which is 16 frames (16*90 ms=1.44 seconds). The actual implementation, however, may not be uniform due to historical or legacy factors. Thus, instead of every 16 frames, a beam may cycle, for example, as 14 frames between burst 1 and burst 2, 18 frames between bursts 2 and 3 and 16 frames between bursts 3 and 1 (pattern repeats on this 3 burst 'super-cycle'). Beams 1-16 may be in one panel, 17-32 in another, and 33-48 in another, for example.

An exemplary script that controls the LEO satellite burst schedule on a LEO satellite for 3 bursts/frame/satellite repeat rate may be given by:
{{10, 13, 12}, {26, 29, 28}, {42, 45, 44}, {9, 1, 11}, {25, 17, 27}, {41, 33, 43}, {8, 5, 15}, {24, 21, 31}, {40, 37, 47}, {6, 4, 16}, {22, 20, 32}, {38, 36, 48}, {3, 7, 14}, {19, 23, 30}, {35, 39, 46}, {5, 12, 9}, {21, 28, 25}, {37, 44, 41}, {2, 11, 13}, {18, 27, 29}, {34, 43, 45}, {1, 15, 10}, {17, 31, 26}, {33, 47, 42}, {48, 35, 38}, {16, 3, 6}, {32, 19, 22}, {28, 24, 20}, {12, 8, 4}, {44, 40, 36}, {27, 25, 23}, {11, 9, 7}, {43, 41, 39}, {30, 18, 21}, {14, 2, 5}, {46, 34, 37}, {29, 26, 17}, {13, 10, 1}, {45, 42, 33}, {31, 22, 24}, {15, 6, 8}, {47, 38, 40}, {23, 32, 19}, {7, 16, 3}, {39, 48, 35}, {20, 30, 18}, {4, 14, 2}, {36, 46, 34}}};

Each set has three beam numbers since the same burst may be transmitted on three beams, and there may be 48 such sets, after which the pattern repeats.

An exemplary script that controls the LEO satellite burst schedule for 2 bursts/frame/satellite repeat rate (i.e., two bursts transmitted simultaneously from two satellite beams per frame) may be given by:
{{1, 7}, {17, 23}, {33, 39}, {2, 11}, {18, 27}, {34, 43}, {3, 12}, {19, 28}, {35, 44}, {5, 13}, {21, 29}, {37, 45}, {4, 14}, {20, 30}, {36, 46}, {6, 9}, {22, 25}, {38, 41}, {8, 15}, {24, 31}, {40, 47}, {10, 16}, {26, 32}, {42, 48}, {39, 33}, {7, 1}, {23, 17}, {27, 18}, {11, 2}, {43, 34}, {28, 19}, {12, 3}, {44, 35}, {29, 21}, {13, 5}, {45, 37}, {30, 20}, {14, 4}, {46, 36}, {25, 22}, {9, 6}, {41, 38}, {31, 24}, {15, 8}, {47, 40}, {32, 26}, {16, 10}, {48, 42}};

Each set has two beam numbers because the same burst may be transmitted on two beams, and there may be 48 such sets, after which the pattern repeats.

The rate at which a LEO satellite receiver receives bursts may be affected by factors such as a beam possibly not bursting as scheduled or other factors that can actually increase the number of bursts per ~1.5 seconds. The receiver should see bursts from other satellites, up to three in general. Therefore, with the varying arrival times due to geometry, the receiver should see more than one burst per ~1.5 seconds on average.

The receiver may also see the adjacent beams from the same satellite, just as the receiver would pick up beams from other satellites. Thus, the least a receiver would see is only one beam from one satellite on average every 1.44 seconds approximately. The longest time between bursts on a particular beam for one super-cycle may be 18 frames, or 1.62 seconds.

Each satellite may transmit a burst out of a given beam on average every 1.5 seconds and the bursts occur on 90 ms frame boundaries, while the receiver may see up to three satellites. The opportunities for transmitting a burst are fixed. But the actual bursts transmitted depend on the satellite power load and other scheduling factors.

In an exemplary scenario, each burst may be 20 ms long. The satellites may be in sync but their clocks may typically vary by a few microseconds. The range to the satellites can create differences in time of arrival of about 10 ms. The bursts typically don't overlap, but if they do, as long as their Doppler shift is different enough or one is much stronger than the other satellite, both signals may be extracted with some degradation.

If the power of the bursts were to be increased, it likely would change the 3 burst/frame/satellite repeat rate of ~1.44 s to 2 burst/frame/satellite at approximately 2.16 seconds, which would be ~0.5 second delta between bursts from a given satellite beam in the worst case.

Since the burst arrival times are predetermined, the wireless device may have functionality in software, for example, to shut down the receiver and save power for battery based systems. The receiver may also intelligently decide which satellites and beams to look for and selectively turn on the receiver based on the burst schedule in the satellite burst schedule data files. An exemplary burst schedule is shown in FIG. 12.

FIG. 12 is an exemplary satellite burst schedule, in accordance with an embodiment of the invention. In an exemplary scenario, there may be 48 beams in each LEO satellite. The beam number is one of the columns of the satellite burst data table. Beams 1-16 are in one panel, 17-32 in another, and 33-48 in another. In instances where lower positioning accuracy is acceptable, a subset of the bursts may be selected to be received. Accordingly, RF circuitry and IF blocks may be powered off and on according to a sleep schedule configured based on the satellite burst schedule data file and desired positioning accuracy and power usage.

An accuracy policy may be determined based on assumptions such as LEO satellites and beams being synchronized to a 90 ms clock and with burst arrival times being off by 2 to 12 ms based on the distance between the satellite and receiver. In addition, the satellites may transmit the same timing burst from three beams pointing to different areas. One strong burst may be received at the receiver location as well as faint or low energy bursts of the other beams. The Doppler shifts would be different so they would not interfere with each other, even though they overlap. This may also occur if beams from other satellites are transmitting during the same burst.

The geo-location may be computed with just one satellite, but the accuracy would likely be low. Knowing the receiver altitude would help increase the accuracy. The geo location engine filter may need many bursts, up to 20 for example, to get reasonable position accuracy. Once the position is computed, even if the receiver is not receiving subsequent bursts, the position accuracy may not degrade if the receiver is not in motion. In an example scenario, an accelerometer may be utilized to determine whether the wireless device is in motion. Each of these factors may be utilized to determine which bursts are important and balance the RF circuitry and IF block sleep schedule.

In an embodiment of the invention, a method and system may comprise receiving LEO RF satellite signals utilizing a LEO satellite signal receiver path 113, 210, 260 in a wireless communication device 101. Circuitry in the LEO satellite signal receiver path 113, 210, 260 may be configured in a powered down state based on a sleep schedule. A location of the wireless communication device 101 may be determined utilizing LEO signals received by the LEO satellite signal receiver path 113, 210, 260.

The sleep schedule may be based on a desired accuracy of the determined location. The sleep schedule may be based on relative strengths C/N of signals received from a plurality of LEO satellites 107. The relative strengths of received signals, C/N, may be compared utilizing a sort module 305A in a LEO demodulator 305 in the LEO satellite signal receiver path 113, 210, 260.

The sleep schedule may be based on a relevance factor 309 generated by a position engine 307 and communicated to the sort module. The sleep schedule may be received from a server. The sleep schedule may be based on a desired power level of the wireless communication device 101. The wireless communication device 101 may comprise a medium Earth orbit satellite signal receiver path 220, 250. In-phase and quadrature signals may be processed in the LEO satellite signal receiver path 113, 210, 260. The wireless communication device 101 may be controlled by a reduced instruction set computing (RISC) central processing unit (CPU) 115, 219, 267.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for power optimization of a global navigation satellite system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless communication device having a low Earth orbit (LEO) satellite signal receiver path:
   receiving LEO RF satellite signals utilizing said LEO satellite signal receiver path;
   determining a location of said wireless communication device utilizing said received LEO RF satellite signals received by said LEO satellite signal receiver path; and
   configuring circuitry in said LEO satellite signal receiver path in a powered down state when said circuitry is not needed for receiving LEO RF satellite signals, based on a sleep schedule, said sleep schedule being based at least in part on satellite availability information received from a reference receiver external to said wireless communication device and on relative strengths of signals received from a plurality of LEO satellites, said relative strengths compared utilizing a sort module in a LEO demodulator in said LEO satellite signal receiver path.

2. The method according to claim 1, wherein said sleep schedule is based on a desired accuracy of said determined location.

3. The method according to claim 1, wherein said sleep schedule is based on a relevance factor generated by a position engine and communicated to said sort module.

4. The method according to claim 1, wherein said sleep schedule is received from a server.

5. The method according to claim 1, wherein said sleep schedule is based on a desired power level of said wireless communication device.

6. The method according to claim 1, wherein said sleep schedule is based on a battery level in said wireless device.

7. The method according to claim 1, wherein said wireless communication device also comprises a medium Earth orbit satellite signal receiver path.

8. The method according to claim 1, comprising processing in-phase and quadrature signals in said LEO satellite signal receiver path.

9. The method according to claim 1, wherein said wireless communication device is controlled by a reduced instruction set computing (RISC) central processing unit (CPU).

10. A system for wireless communication, the system comprising:
   one or more circuits for use in a wireless communication device comprising a low Earth orbit (LEO) satellite signal receiver path, said one or more circuits being operable to:
   receive LEO RF satellite signals utilizing said LEO satellite signal receiver path;
   determine a location of said wireless communication device utilizing said received LEO RF satellite signals received by said LEO satellite signal receiver path; and
   configure circuitry in said LEO satellite signal receiver path in a powered down state when not needed for receiving LEO RF satellite signals, based on a sleep schedule, said sleep schedule being based at least in part on satellite availability information received from a reference receiver external to said wireless communication device and on relative strengths of signals received from a plurality of LEO satellites, said relative strengths compared utilizing a sort module in a LEO demodulator in said LEO satellite signal receiver path.

11. The system according to claim 10, wherein said sleep schedule is based on a desired accuracy of said determined location.

12. The system according to claim 10, wherein said sleep schedule is based on a relevance factor generated by a position engine and communicated to said sort module.

13. The system according to claim 10, wherein said sleep schedule is received from a server.

14. The system according to claim 10, wherein said sleep schedule is based on a desired power level of said wireless communication device.

15. The system according to claim 10, wherein said sleep schedule is based on a battery level in said wireless device.

16. The system according to claim 10, wherein said wireless communication device also comprises a medium Earth orbit satellite signal receiver path.

17. The system according to claim 10, wherein said wireless communication device is controlled by a reduced instruction set computing (RISC) central processing unit (CPU).

18. A system for wireless communication, the system comprising:
one or more circuits for use in a wireless communication device comprising a medium Earth orbit (MEO) satellite signal receiver path and a low Earth orbit (LEO) satellite signal receiver path, said one or more circuits being operable to:
receive LEO RF satellite signals utilizing said LEO satellite signal receiver path and MEO RF satellite signals utilizing said MEO satellite signal receiver path;
determine a location of said wireless communication device utilizing MEO signals received by said MEO satellite signal receiver path and LEO signals received by said LEO satellite signal receiver path; and
configure circuitry in said LEO satellite signal receiver path or said MEO satellite signal receiver path in a powered down state when not needed for receiving RF satellite signals, based on a sleep schedule, said sleep schedule being based at least in part on satellite availability information received from a reference receiver external to said wireless communication device and on relative strengths of signals received from a plurality of LEO satellites, said relative strengths compared utilizing a sort module in a LEO demodulator in said LEO satellite signal receiver path.

19. The system according to claim 18, comprising configuring said MEO satellite signal receiver path when a signal strength of said received MEO satellite signals falls below a threshold level.

20. The system according to claim 18, comprising configuring said MEO satellite signal receiver path in an intermittent low power state based on said received LEO RF satellite signals.

* * * * *